United States Patent
Natanzon et al.

(10) Patent No.: US 8,769,336 B1
(45) Date of Patent: Jul. 1, 2014

(54) METHOD AND APPARATUS FOR PREVENTING JOURNAL LOSS ON FAILOVER IN SYMMETRIC CONTINUOUS DATA PROTECTION REPLICATION

(75) Inventors: Assaf Natanzon, Ramat Gan (IL); Saar Cohen, Mishmeret (IL); Efri Nattel-Shay, Tel-Aviv (IL)

(73) Assignee: EMC Corporation, Hopkinton, MA (US)

( * ) Notice: Subject to any disclaimer, the term of this patent is extended or adjusted under 35 U.S.C. 154(b) by 183 days.

(21) Appl. No.: 13/337,651

(22) Filed: Dec. 27, 2011

(51) Int. Cl.
*G06F 11/00* (2006.01)

(52) U.S. Cl.
USPC .......................... 714/6.23; 714/6.3

(58) Field of Classification Search
USPC ........... 714/6.23, 6.22, 6.3, 6.31, 6.32, 11–13
See application file for complete search history.

(56) References Cited

U.S. PATENT DOCUMENTS

| | | | |
|---|---|---|---|
| 2003/0126315 A1* | 7/2003 | Tan et al. | 710/1 |
| 2004/0083403 A1* | 4/2004 | Khosravi | 714/13 |
| 2008/0086608 A1* | 4/2008 | Kano | 711/162 |
| 2008/0256286 A1* | 10/2008 | Ash | 711/6 |

* cited by examiner

*Primary Examiner* — Dieu-Minh Le
(74) *Attorney, Agent, or Firm* — Krishnendu Gupta; Gerald P. Kazanjian (57) ABSTRACT

In traditional journal based replication environments, the journal is lost on failover. However, example embodiments of the present invention overcome this and other deficiencies by preserving a journal in a symmetric continuous data protection environment. Therefore, example embodiments of the present invention provide a method, an apparatus, and a computer program production for preserving a journal in a symmetric continuous data protection environment. The method comprises maintaining a journal in a journal-based replication environment comprising a production volume at a production site and a replication volume at a replication site and, after detecting a failover event, symmetrically preserving the journal after failover.

17 Claims, 8 Drawing Sheets

(BEFORE FAILOVER)
FIG. 3

FIG. 4
(AFTER FAILOVER)

METHOD AND APPARATUS FOR
PREVENTING JOURNAL LOSS ON
FAILOVER IN SYMMETRIC CONTINUOUS
DATA PROTECTION REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data protection.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

Example embodiments of the present invention provide a method, an apparatus, and a computer program production for preserving a journal in a symmetric continuous data protection environment. The method comprises maintaining a journal in a journal-based replication environment comprising a production volume at a production site and a replication volume at a replication site and, after detecting a failover event, symmetrically preserving the journal after failover.

BRIEF DESCRIPTION OF THE DRAWINGS

The above and further advantages of the present invention may be better under stood by referring to the following description taken into conjunction with the accompanying drawings in which.

DETAILED DESCRIPTION

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side; and WAN—a wide area network that connects local networks and enables them to communicate with one another, such as the Internet.

Description of Embodiments Using a Five State Journaling Process

Figure 1:
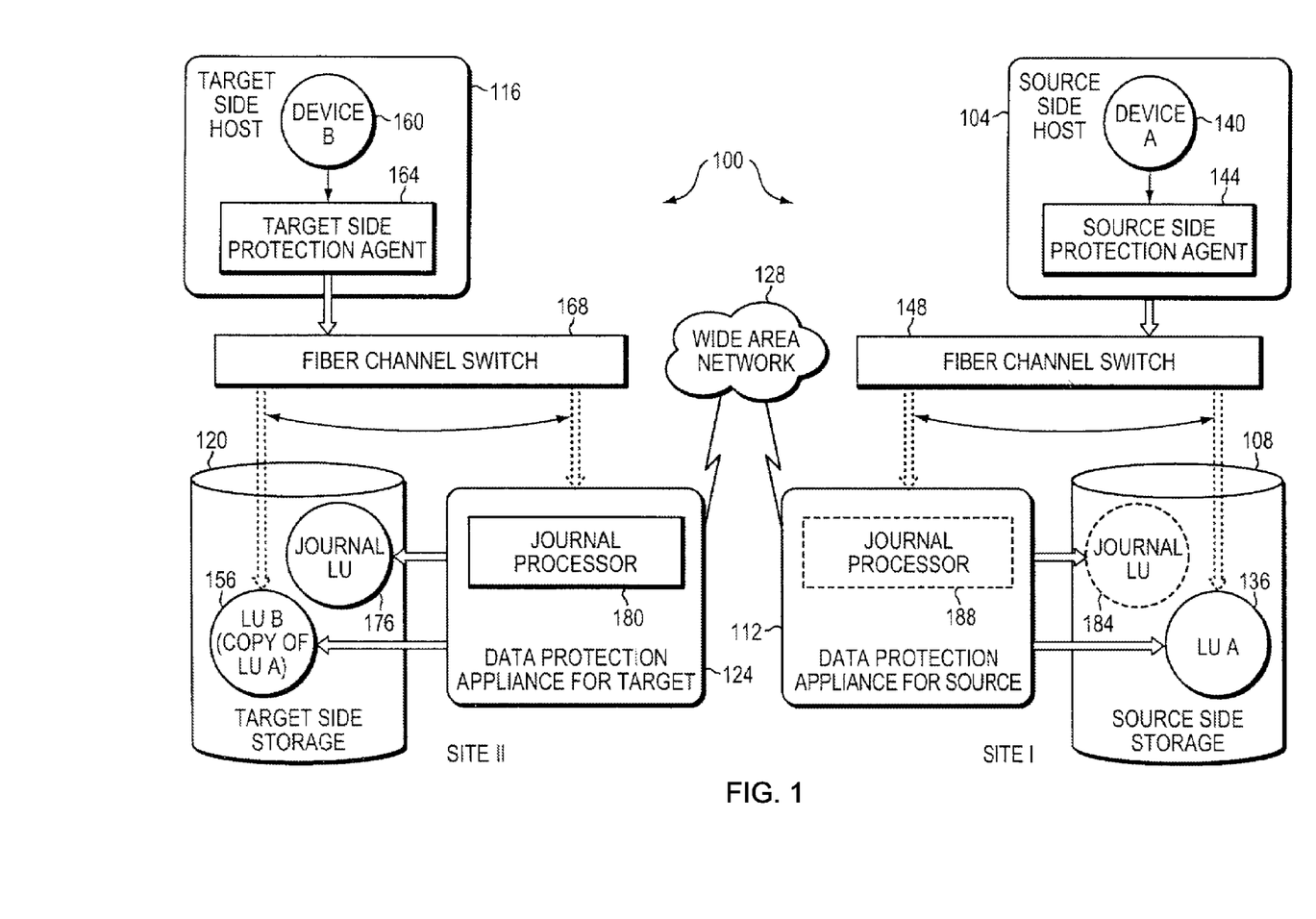
FIG. 1 is a simplified illustration of a data protection system, in accordance with an embodiment of the present invention.

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
  Redirect the SCSI command to another logical unit;
  Split the SCSI command by sending it first to the respective DPA. After the DPA returns an acknowledgement, send the SCSI command to its intended logical unit;
  Fail a SCSI command by returning an error return code; and
  Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120. DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
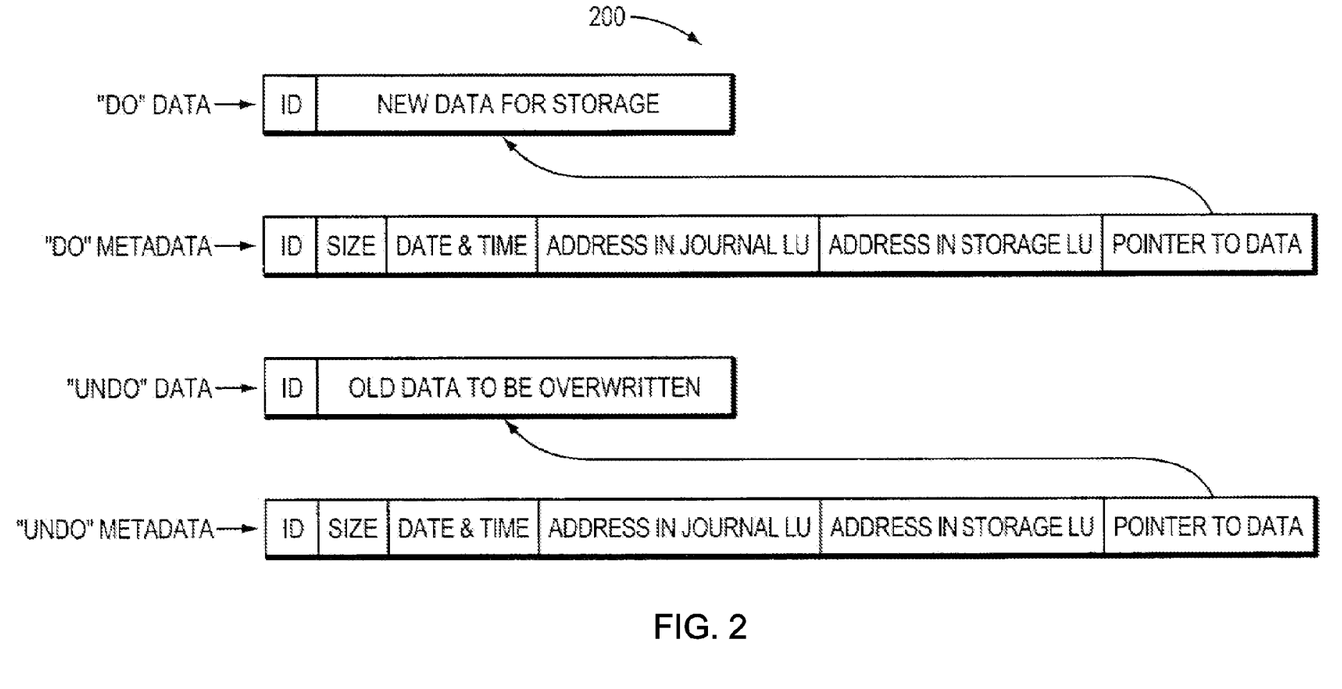
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWER-PATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Preserving the Journal in Symmetric Continuous Data Protection after Failover

In traditional journal based replication environments, the journal is lost on failover. This presents a problem because the journal keeps differentials from the replica volume and thus, during failover, because the replica volume is not at the same point in time as the production volume, the journal becomes irrelevant and all point in time data is lost. However, example embodiments of the present invention overcome this and other deficiencies by preserving a journal in a symmetric continuous data protection environment.

Figure 3:
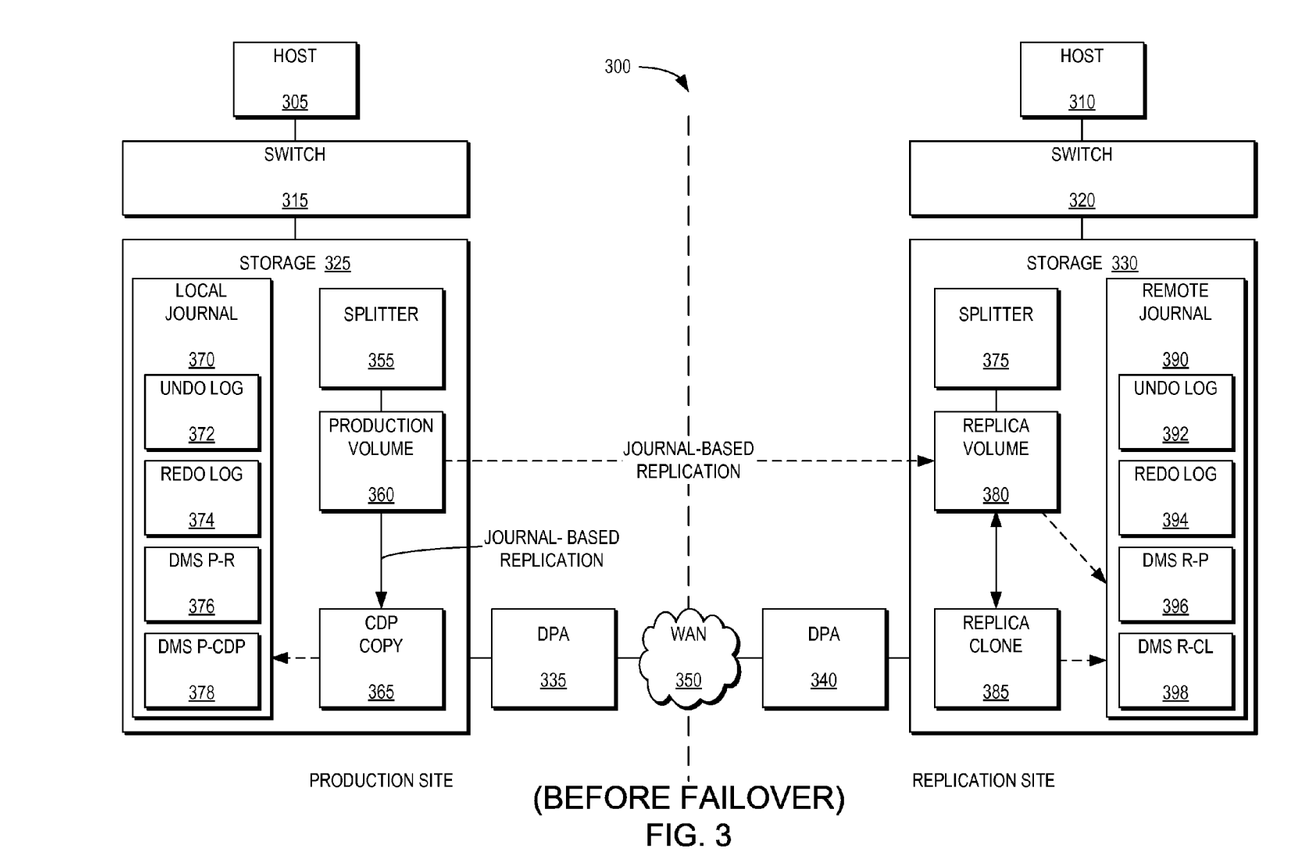
FIGS. 3-4 are block diagrams illustrating a data protection environment 300 prior to and following a failover event, respectively, and the preservation of the journal following failover.
Figure 4:
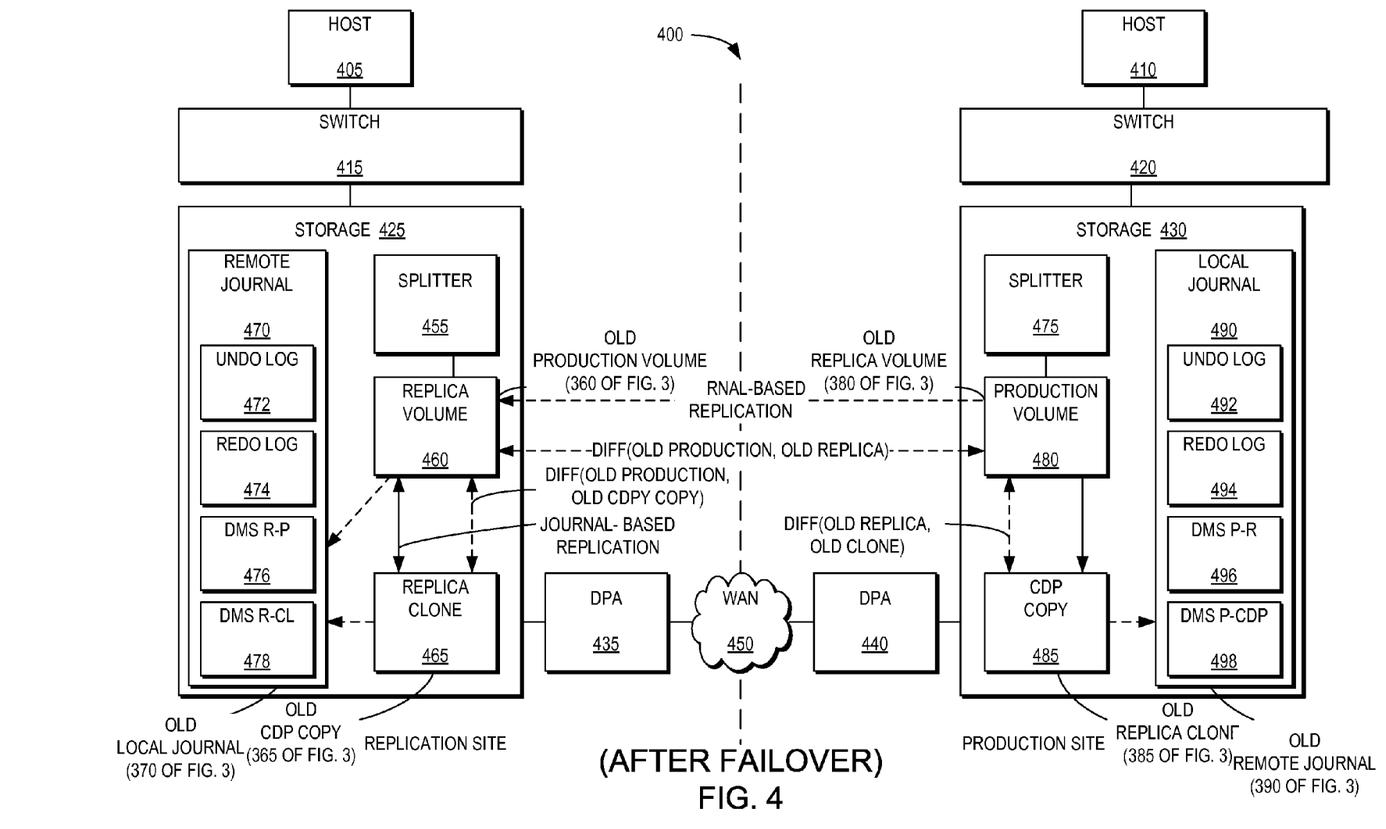

FIGS. 3 and 4 are block diagrams illustrating a data protection environment 300, 400 comprising a production site and a replication site before and after a failover event, with journal-based replication being performed across the sites from the production site to the replication site. FIGS. 3-4 may be studied in combination with the flow diagrams of FIGS. 5-10, illustrating example methods for preserving a journal in journal-based replication after failover, as described below.

FIG. 3 is a block diagram illustrating a data protection environment 300 prior to a failover event with journal-based replication being performed from the production site to the replication site. As illustrated in FIG. 3, a production site includes a host 305 which may issue I/Os via a switch 315 to production site storage 325. The I/O may be intercepted by a production site splitter 355, with the I/O replicated to a production site DPA 335 and a production volume 360. A CDP copy 365 of the production volume 360 may be maintained at the production site. Further, a local journal 370 may be maintained (505), logging changes made to the production volume 360.

The production site DPA 335 may send the replicated I/O over a WAN 350 to a replication site DPA 340 which may write the I/O to a replication volume 380. The replication site also includes a host 310, a switch 320, and a splitter 375 similar to the production site. A clone 385 of the replication volume 380 is maintained at the replication site, with a journal volume 390 logging changes made to both the replication volume 380 and the replication clone 385.

As described above, during normal operations (i.e., FIG. 3), the direction of replication data flow goes from source side (i.e., production site) to target side (i.e., replication site). It is possible, however, for a user to reverse the direction of replication data flow, in which case the production site starts to behave as a replication site, and the replication site starts to behave as a production site. Such change of replication direction is referred to as a "failover", which may be performed, for example, in the event of a disaster at the production site, or for other reasons. The replica clone 385 is maintained identical to the replica volume 380 by the replication site DPA 340 (i.e., every I/O which is applied to the replica volume 380 by the DPA 340 is applied to the replica clone 385, in case of a failure.

Figure 5:
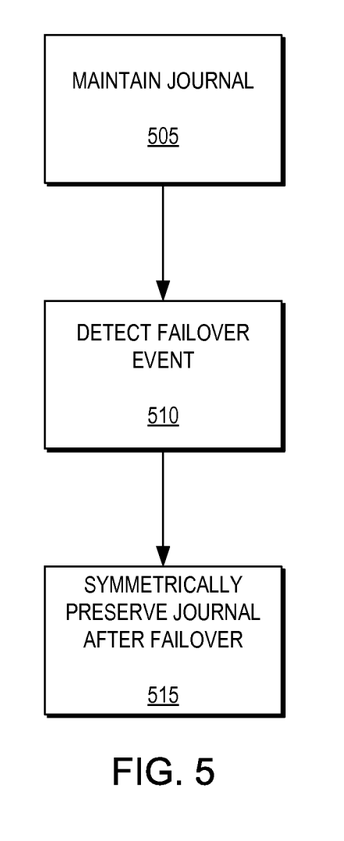
FIGS. 5-10 are flow diagrams illustrating example methods for preserving the journal in a symmetric continuous data protection (CDP) environment according to example embodiments of the present invention.

FIG. 4 is a block diagram illustrating a data protection environment 400 following to a failover event with journal-based replication being performed from the replication site to the production site. As will be described below, in contrast to the results of failover events in traditional journal-based replication environments, example embodiments of the present invention preserve the journal. As illustrated in FIGS. 4 and 5, a failover event is detected (510). For example, a user may direct the DPAs 435, 440 to reverse the direction of replication from the replication site to the production site because of a disaster at the production site. The DPA 435 at the production site may detect this failover event (510), perform journal-based replication from the new production volume 480 (i.e., old replica volume 380 of FIG. 3) to the new replica volume 460 (i.e., old production volume 360 of FIG. 3) using the remote journal 490, and symmetrically preserve the journal, described in greater detail below.

Figure 6:
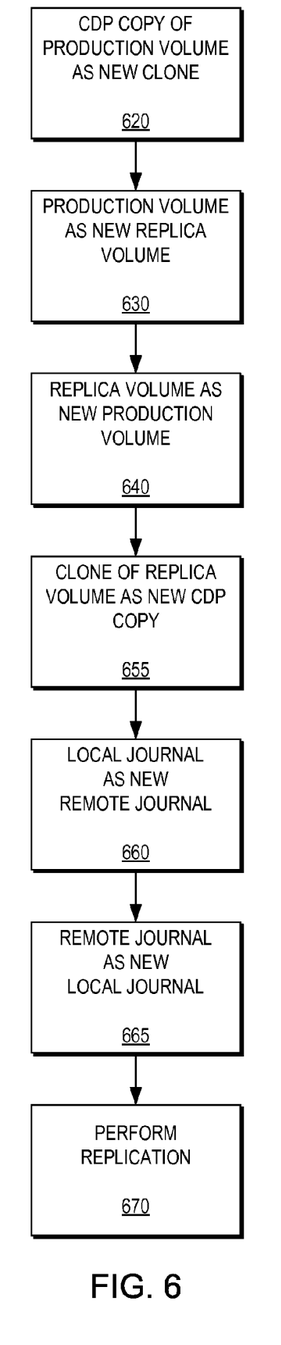

FIG. 6 is a flow diagram illustrating a method according to an example embodiment of the present invention for preserving the journal in journal-based replication. As illustrated in FIGS. 3, 4, and 6, the DPA 435, 440 assigns the old CDP copy of the production volume 365 of FIG. 3 as a new clone of the new replica volume 465 of FIG. 4 (620), assigns the old production volume 360 of FIG. 3 as a new replica volume 460 of FIG. 4 (630), assigns the old replica volume 380 of FIG. 3 as a new production volume 480 of FIG. 4 (640), and assigns the old clone of the old replica volume 385 of FIG. 3 as a new CDP copy of the new production volume 485 of FIG. 4 (655). Further, the old local journal 370 of FIG. 3 for the old CDP copy 365 of FIG. 3 becomes the new remote journal 470 for both the new replica volume 460 and the replica clone 465 of FIG. 4 (660). Likewise, the old remote journal 390 of FIG. 3 for the old replica clone 385 of FIG. 3 becomes the new local journal 490 for the new CDP copy 485 of FIG. 4 (665).

The DPAs 435, 440 are able to do this because the differences between the old production volume, old replica volume, old CDP copy, and old replica clone are known from journaling.

Moreover, the old production volume 360 and the old replica volume 380 are copies of each other that may be at different points in time. Therefore, the differences between the old production volume 360 and the old replica volume 380 are also known in the old remote journal 390 (i.e., data which is in the do stream in case the fail over is not to the latest point in time) and the local delta marker stream for the production volume and the replica volume (DMS P-R) 376, where (DMS P-R) is the delta marker stream between production copy and replica copy maintained at journal 470.

Figure 7:
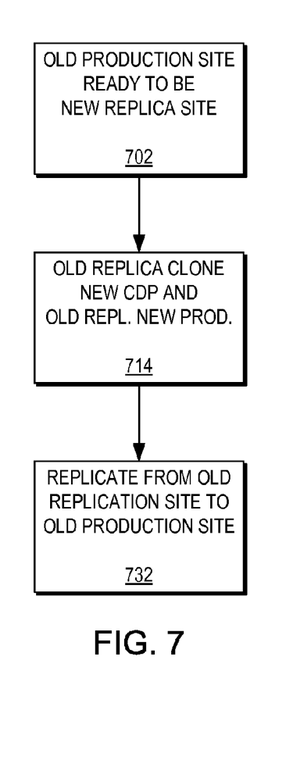
Figure 8:
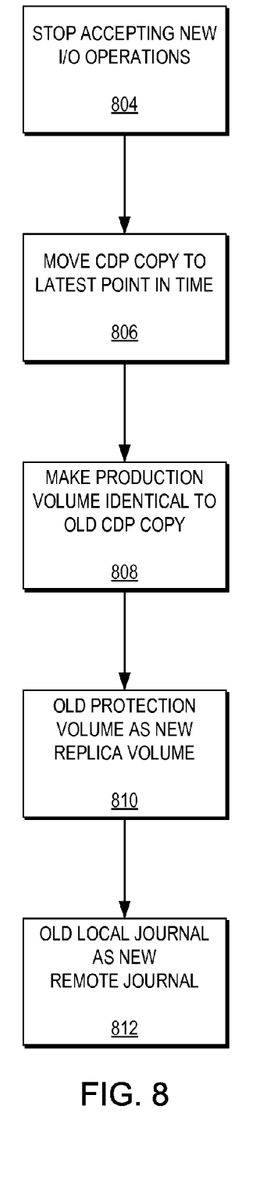

In certain embodiments, there are three steps to failover, illustrated in FIGS. 7-10. As illustrated in FIG. 7, failover involves making the old production site ready to be a replica site (702) (described in greater detail below with reference to FIG. 8):

making the old replica clone 385 become the new CDP copy or replica volume 485 and making the old replica volume 380 the new production volume 480 (714) (described in greater detail below with reference to FIG. 9), and starting replication from storage 330 at the old replication site to storage 325 at the old production site (732). The first two steps (702), (714) may be performed in parallel. In certain embodiments, once the production volume stops accepting I/Os, step 2 (714) will kick in since user will want to start an application at the old replica site. FIG. 8 is a flow diagram illustrating an example method for making the old production site ready to be a replica site (702). As illustrated in FIG. 8, first the DPA 335 stops the old production volume 360 from accepting new I/O operations (i.e., the DPA 335 fails all new I/O commands) (804). The DPA 335 then moves the old CDP copy 365 to its latest point in time (806) so no data remains in the undo log of the local journal 370. The DPA 335 then makes the old production volume 360 identical to the old CDP copy 365 (808). In most cases, once the old CDP copy 365 is rolled to its latest point in time (806), the old production volume 360 and the old CDP copy 365 already may be identical. In other cases, the list of changes is in the delta marker stream DMS P-CDP 378 in the journal 370 for the old production volume 360. Finally, the DPA 335 may assign the old production volume 360 to be the new replica volume 460 (810), may assign the old CDP copy 365 to be the new clone 465 (812), and may assign the old local journal 370 for the old CDP copy 365 to be the new remote journal 470 for the new replica volume 460 and the new replica clone 465 (812).

Figure 9:
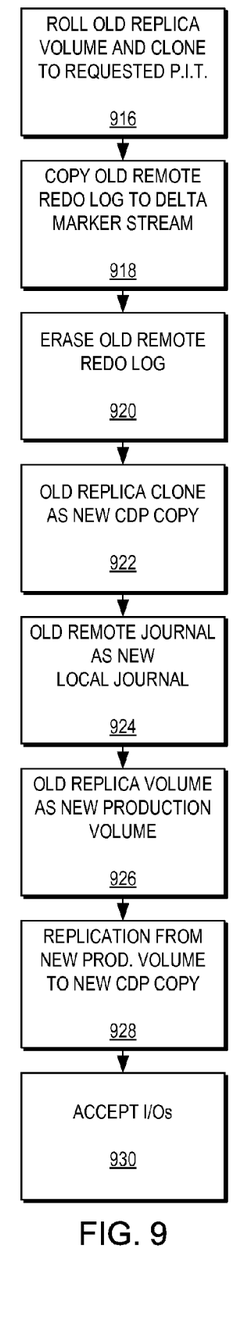

FIG. 9 is a flow diagram illustrating an example method for making the old replica clone 385 become the new CDP copy or replica volume 485 and making the old replica volume 380 the new production volume 480 (714). First, the replication site DPA 340 rolls the old replica volume 380 and the old replica clone 385 to a requested point in time (916) indicated by the user. Metadata of data currently in the redo log of the old remote journal 390 is copied to the delta marker stream DMS R-P 396 (918) which contains the differences between the old replica volume 380 and the old production volume 360. The redo log 394 in the remote journal 390 is then erased (920), such that only the undo log 392 of the remote journal 390 remains. The DPA 340 then assigns the old replica clone 385 to be the new CDP copy 485 of the new production volume 380 (922) and assigns the old remote journal 390 for the old replica volume 380 and the old replica clone 385 to be the new local journal 490 for the new CDP copy 485 (924). Further, the DPA 340 assigns the old replica volume 380 to be the new production volume 480 (926) and then starts replication from the new production volume 480 to the new CDP copy 485 (i.e., the new production volume 480 and the new CDP copy 485 are already identical, so no initialization is necessary) (928). Finally, the new production volume 480 make start accepting I/Os from an application on the host 310 (930).

It should be noted that the example methods described above with reference to FIGS. 8 and 9 may be executed in parallel. For example, in certain embodiments, once the old production volume 360 stops accepting I/Os, the method illustrated in FIG. 9 may start automatically so the user may start an application on the host 310.

Figure 10:
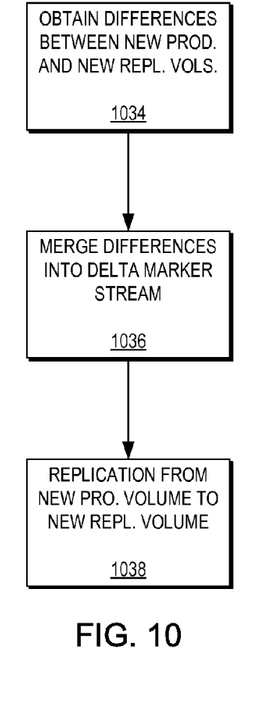

FIG. 10 is a flow diagram illustrating an example method for starting replication from storage 330 at the old replication site to storage 325 at the old production site (732). Initially, there is CDP replication from the new production volume 480 to the new CDP copy 485. Available at the new replication site are the new replica volume 460, the new replica clone 465 and the new remote journal 470 for both the replica volume 460 and the replica clone 465. First the DPA 440 obtains the differences between the new production volume 480 and the new replica volume 460 (1034). This list includes all the changes which are listed in the delta marker stream DMS R-P 396 stored at the old replication site describing the differences between the old replica volume 380 and the old production volume 360. This includes the differences that where in the redo log 394 and new I/Os that arrived to the old replica clone 385. The DPA 340 also obtains the list of all changes that occurred at the old production site and did not reach the old replica site prior to failover which are stored in the delta marker stream DMS P-R 376 of the local journal 370 for the old production volume 360. The differences are then merged into the delta marker stream DMS P-R 496 between the new production volume 480 and the new replica volume 460 stored at the new production site (1036). Replication may then start between the new production volume 480 and the new replica volume 460 (1038).

Figure 11:
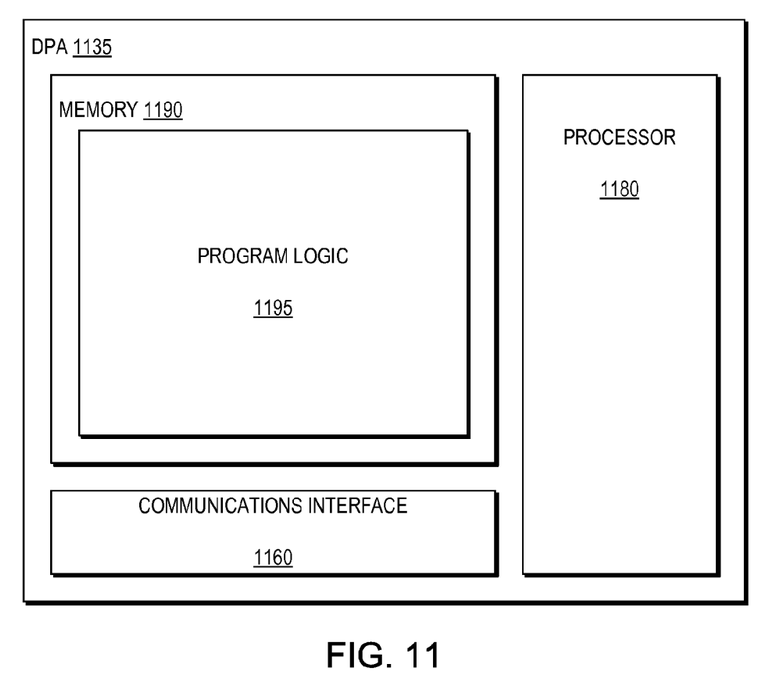
FIG. 11 is a block diagram of an example embodiment apparatus according to the present invention.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 11, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 12:
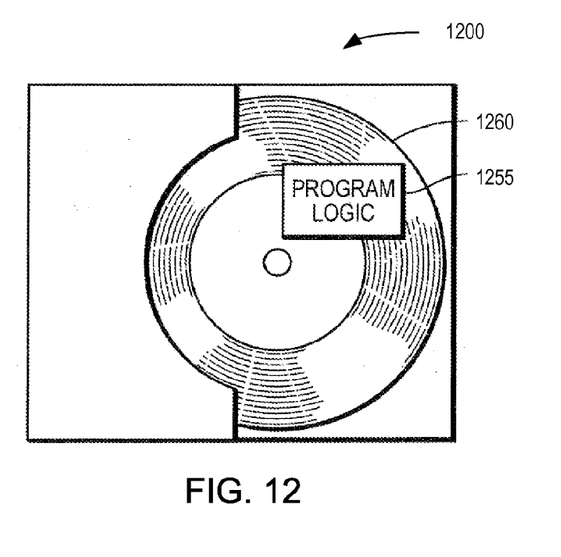
FIG. 12 is an illustration of an example embodiment of the present invention as embodied in program code.

FIG. 12 shows Program Logic 1210 embodied on a computer-readable medium 1230 as shown, and wherein the Logic is encoded in computer-executable code configured for carrying out the reservation service process of this invention and thereby forming a Computer Program Product 1200.

The logic for carrying out the method may be embodied as part of the aforementioned system, which is useful for carrying out a method described with reference to embodiments shown in, for example, FIGS. 1-10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:
1. A method comprising:
 maintaining, in a journal-based replication environment comprising a production volume at a production site and a replica volume at a replication site, a local journal at the production site and a remote journal at the replication site;
 detecting a failover event in the journal-based replication environment; and
 performing journal-based replication from the replica volume at the replication site to the production volume at the production site using the remote journal at the replication site in response to detecting the failover event.

2. The method of claim 1 further comprising
maintaining a local continuous data protection (CDP) copy of the production volume at the production site; and
maintaining a clone of the replica volume at the replication site.

3. The method of claim 2 wherein performing journal-based replication from the replica volume to the production volume using the remote journal comprises:
assigning the CDP copy of the production volume as a new clone of the new replica volume;
assigning the production volume as a new replica volume;
assigning the replica volume as a new production volume;
assigning the clone of the replica volume as a new CDP copy of the new production volume; and
performing replication from the new production volume to the new replica volume.

4. The method of claim 3 wherein assigning the CDP copy of the production volume as a new clone of the new replica volume comprises advancing the CDP copy of the production volume to its latest point in time by rolling the local journal to the latest point in time.

5. The method of claim 3 wherein assigning the production volume as a new replica volume comprises making the new replica volume identical to the CDP copy of the production volume.

6. The method of claim 3 wherein assigning the replica volume as a new production volume comprises setting the delta marker change list between new production volume and new replica volume to be the sum of:
the difference between the replica volume at the point in time selected by a user and the latest point in time arrived to the replica; and
the difference between the production volume and the replica volume.

7. The method of claim 3 wherein assigning the clone of the replica volume as a new CDP copy of the new production volume comprises setting the remote journal as the journal of the CDP copy.

8. An apparatus comprising:
a processor; and
memory encoded with instructions that, when executed by the processor, causes the apparatus to perform the operations of:
maintaining, in a journal-based replication environment comprising a production volume at a production site and a replica volume at a replication site, a local journal at the production site and a remote journal at the replication site;
detecting a failover event in the journal-based replication environment; and
performing journal-based replication from the replica volume at the replication site to the production volume at the production site using the remote journal at the replication site in response to detecting the failover event.

9. The apparatus of claim 8 wherein the memory is encoded with instructions that, when executed by the processor, causes the apparatus to perform the operations of:
maintaining a local continuous data protection (CDP) copy of the production volume at the production site; and
maintaining a clone of the replica volume at the replication site.

10. The apparatus of claim 9 wherein the memory is encoded with instructions that, when executed by the processor, causes the apparatus to perform the operations of:
assigning the CDP copy of the production volume as a new clone of the new replica volume;
assigning the production volume as a new replica volume;
assigning the replica volume as a new production volume;
assigning the clone of the replica volume as a new CDP copy of the new production volume; and
performing replication from the new production volume to the new replica volume.

11. The apparatus of claim 10 wherein the memory is encoded with instructions that, when executed by the processor, causes the apparatus to perform the operation of advancing the CDP copy of the production volume to its latest point in time by rolling the local journal to the latest point in time.

12. The apparatus of claim 10 wherein the memory is encoded with instructions that, when executed by the processor, causes the apparatus to perform the operation of making the new replica volume identical to the CDP copy of the production volume.

13. The apparatus of claim 10 wherein the memory is encoded with instructions that, when executed by the processor, causes the apparatus to perform the operation of setting the delta marker change list between new production volume and new replica volume to be the sum of:
the difference between the replica volume at the point in time selected by a user and the latest point in time arrived to the replica; and
the difference between the production volume the replica volume containing I/Os which did not arrive to the replica volume.

14. The apparatus of claim 10 wherein the memory is encoded with instructions that, when executed by the processor, causes the apparatus to perform the operation of setting the remote journal as the journal of the CDP copy.

15. A computer program product having a non-transitory computer readable storage medium with instructions encoded thereon that, when executed by a processor of a computer, causes the computer to symmetrically preserve a journal, the computer program product comprising:
computer program code for maintaining, in a journal-based replication environment comprising a production volume at a production site and a replica volume at a replication site, a local journal at the production site and a remote journal at the replication site;
computer program code for detecting a failover event in the journal-based replication environment; and
computer program code for performing journal-based replication from the replica volume at the replication site to the production volume at the production site using the remote journal at the replication site in response to detecting the failover event.

16. The computer program product of claim 15 further comprising:
computer program code for maintaining a local continuous data protection (CDP) copy of the production volume at the production site; and
computer program code for maintaining a clone of the replica volume at the replication site.

17. The computer program product of claim 16 wherein computer program code for performing journal-based replication from the replica volume at the replication site to the production volume at the production site using the remote journal at the replication site in response to detecting the failover event comprises:
computer program code for assigning the CDP copy of the production volume as a new clone of the new replica volume;
computer program code for assigning the production volume as a new replica volume;

computer program code for assigning the replica volume as a new production volume;
computer program code for assigning the clone of the replica volume as a new CDP copy of the new production volume; and
computer program code for performing replication from the new production volume to the new replica volume.

* * * * *